M. E. SHINN.
BAND SAW MACHINE.
APPLICATION FILED DEC. 15, 1913.
1,264,339.
Patented Apr. 30, 1918.
4 SHEETS—SHEET 1.
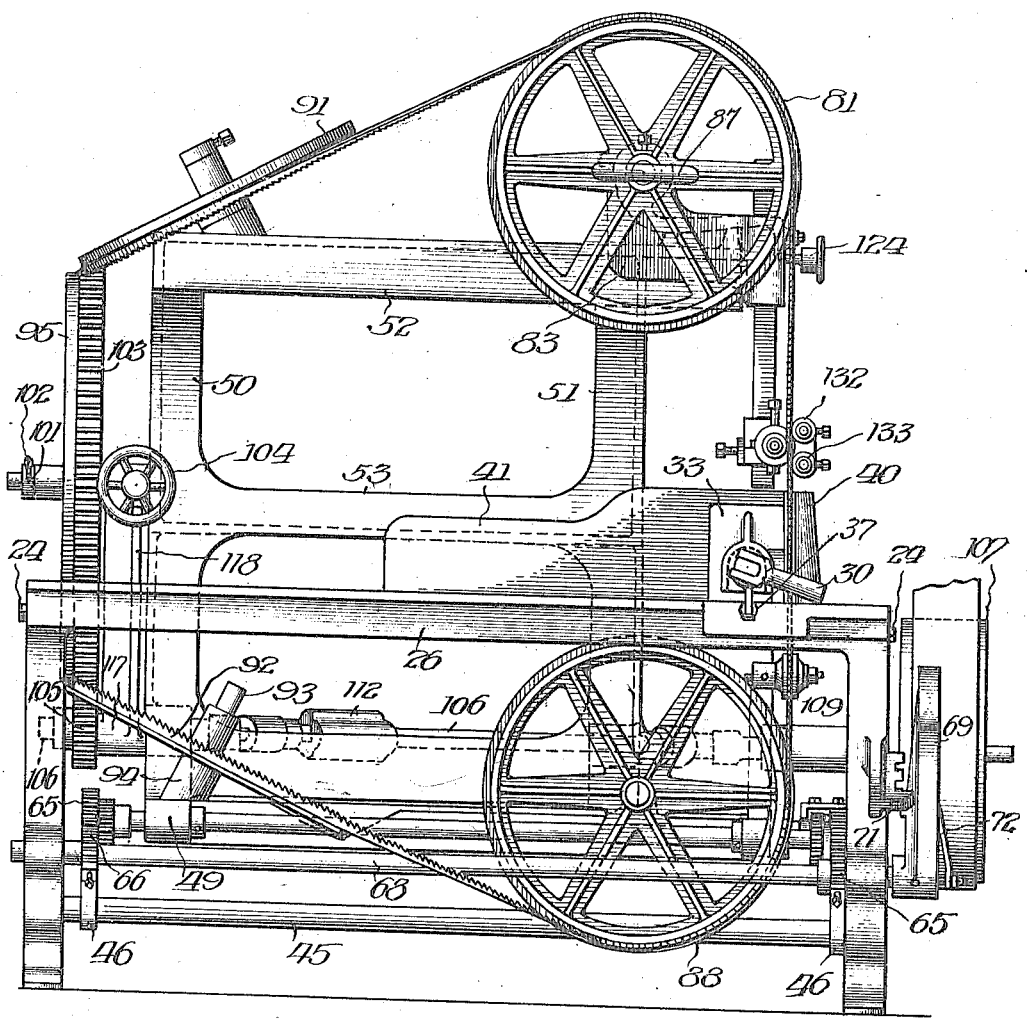
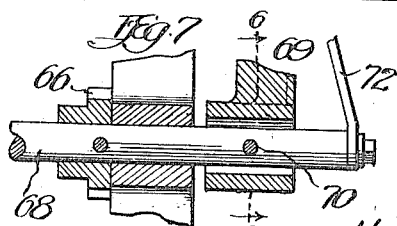
Witnesses:
Inventor:
Martin E. Shinn
By Jno. A. Elliott
Atty.

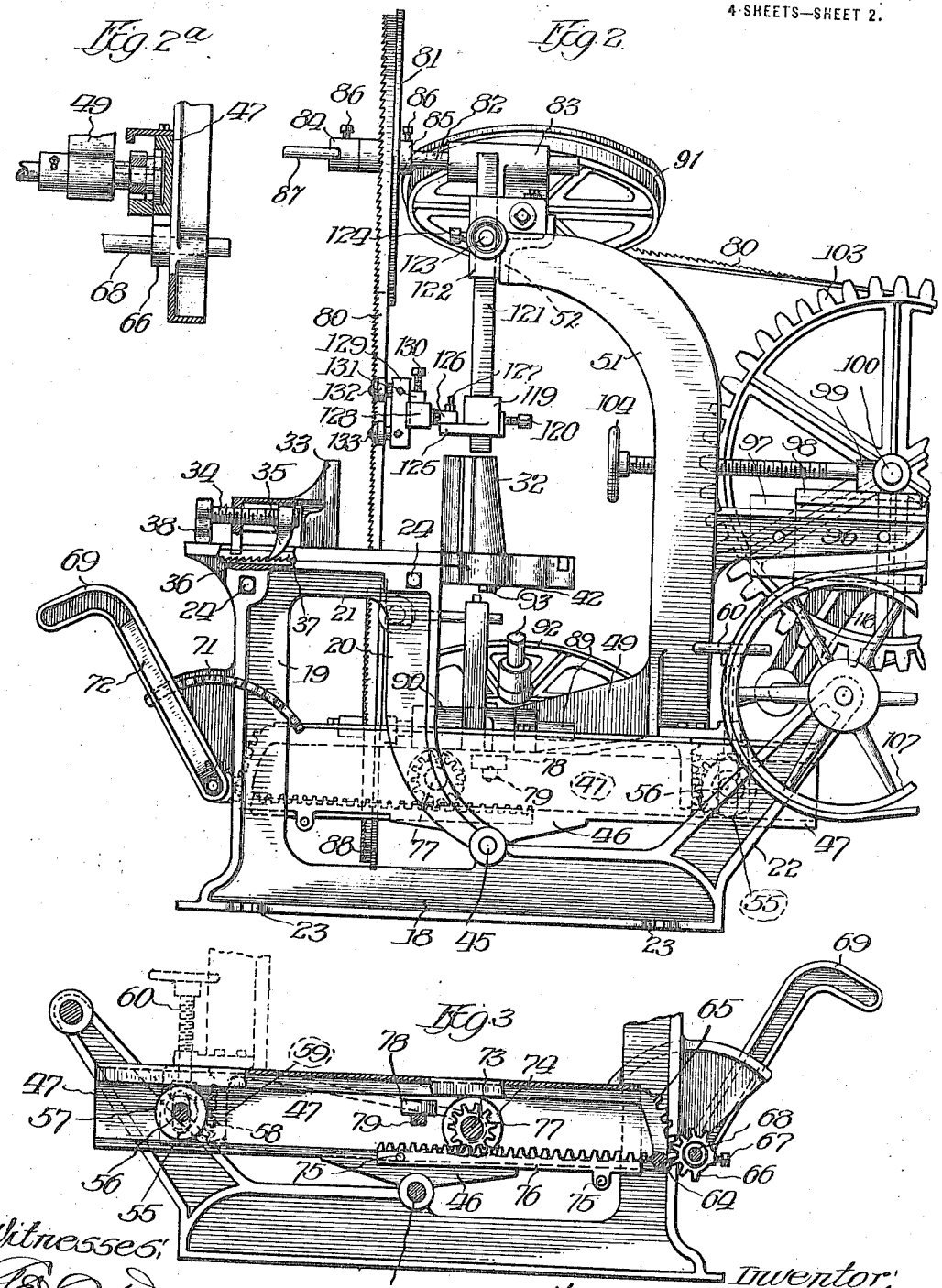

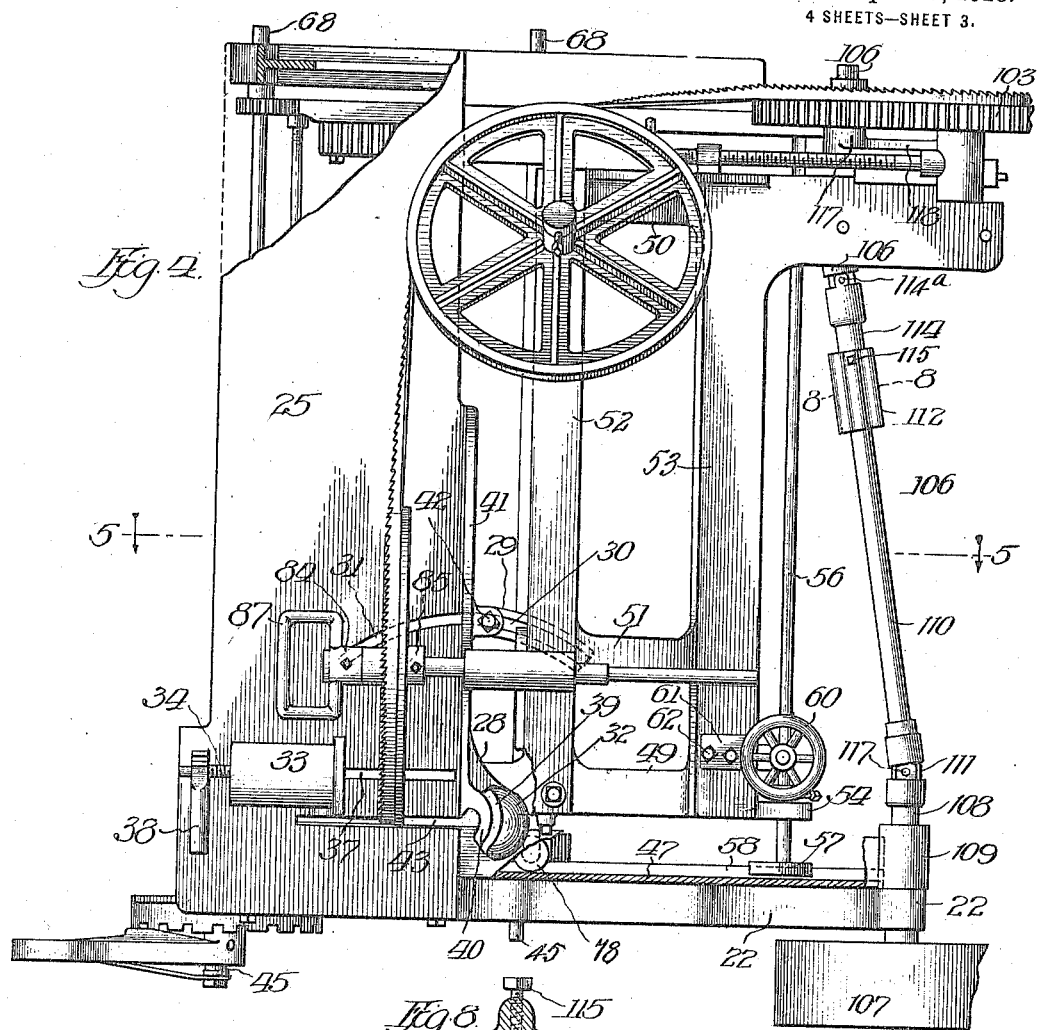
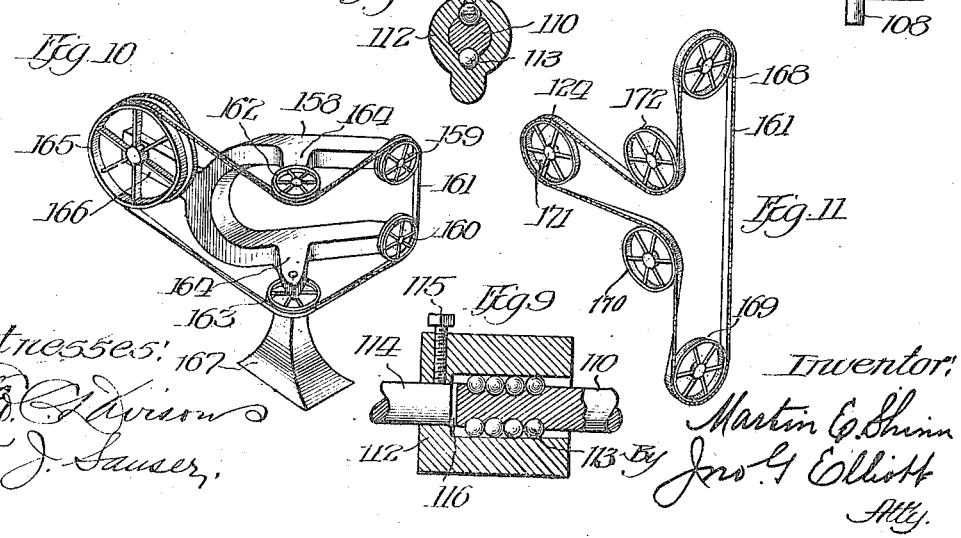

M. E. SHINN.
BAND SAW MACHINE.
APPLICATION FILED DEC. 15, 1913.
1,264,339.
Patented Apr. 30, 1918.
4 SHEETS—SHEET 4.
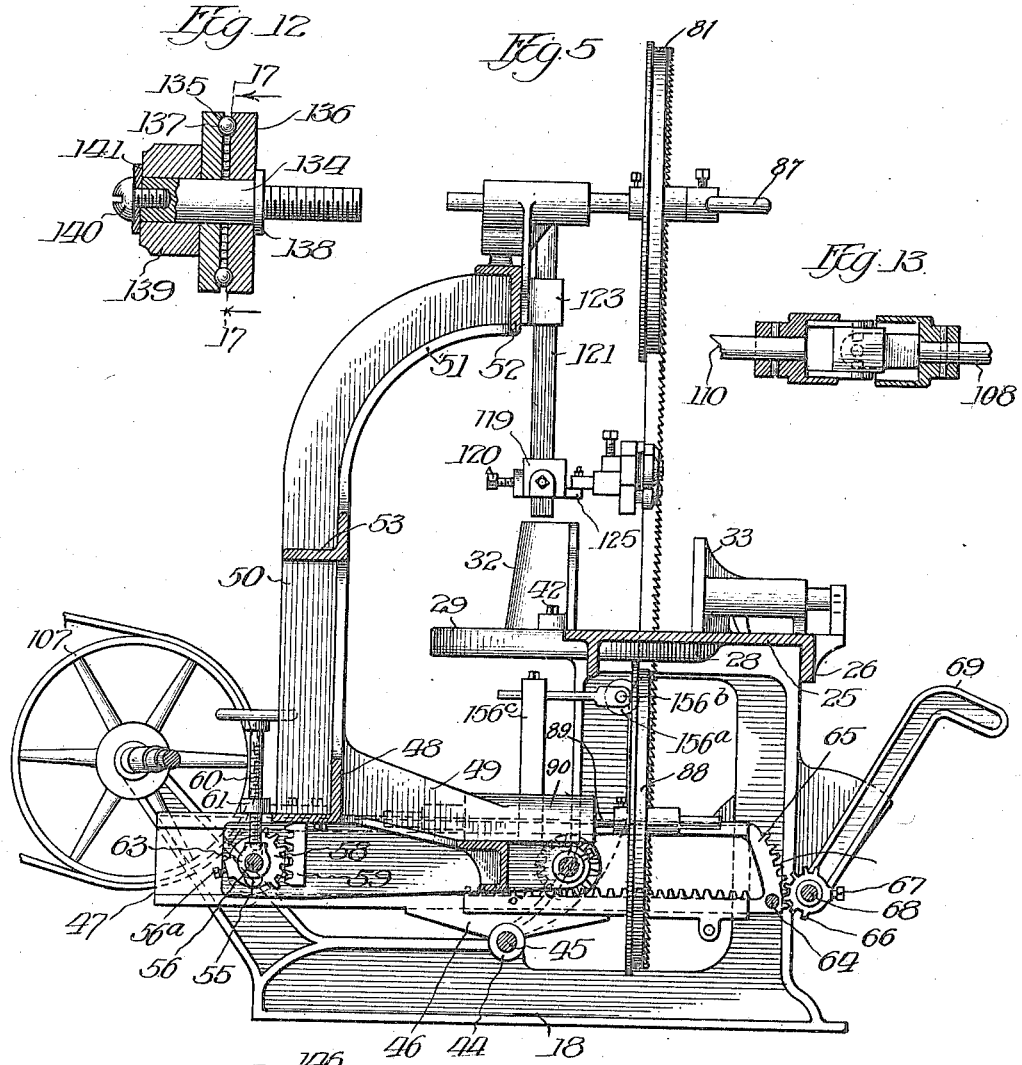
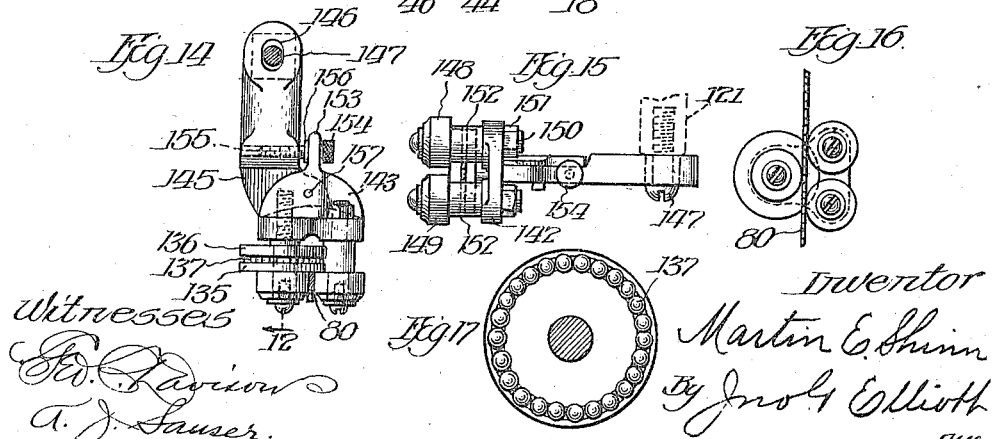

UNITED STATES PATENT OFFICE.

MARTIN E. SHINN, OF CHICAGO, ILLINOIS.

BAND-SAW MACHINE.

1,264,339.  Specification of Letters Patent.  Patented Apr. 30, 1918.

Application filed December 15, 1913. Serial No. 806,724.

*To all whom it may concern:*

Be it known that I, MARTIN E. SHINN, a citizen of the United States, and resident of Chicago, in the county of Cook and State of Illinois, have invented certain new and useful Improvements in Band-Saw Machines, of which the following is a full, clear, and exact specification.

This invention relates to improvements in band saw machines in which heretofore the supporting and driving pulleys direct the endless blade in parallel lines between them, and thereby limit the length of piece to be cut from a strip to that corresponding with the diameter of said wheels.

This invention also relates to improvements in band saw machines in which the path of travel of the band saw is permanently fixed, and the material to be sawed is pushed over a fixed table, and in some instances upon a table movable toward and from the cutting portion of the saw blade.

The prime object of my invention broadly stated is a band saw machine in which there is no limit to the length of piece and pieces that may be severed from a strip and strips of unlimited length and endless strips if need be.

A further object of my invention is a band saw machine of a construction making it possible and practical for the saw to sever from a strip on lines both at a right angle or obliquely thereto, and in opposite directions, pieces limited in length only by the length of strip from which they are severed and from strips of unlimited length.

Another object of my invention is a band saw machine, the endless saw blade of which is movable back and forth toward the material to be operated upon when supported upon a fixed table, and which if desired may also be concurrently movable toward and from a movable endless saw blade.

Another object of my invention is a band saw machine in which the supporting frame for the band saw may be tilted without substantially diverting the cutting portion of an endless saw blade from a vertically poised position.

A further object of my invention is a band saw machine the driving mechanism of which is actuated by means of a flexible drive shaft having a fixed bearing at one end in the frame of the machine, which shaft is so constructed that its length is extended and shortened as the movable carriage supporting the band saw is moved back and forth toward the work being operated upon, and whereby a single shaft of simple construction is provided for driving the band saw actuating driving mechanism.

A still further object of my invention is to adjustably limit the forward movement of the cutting portion of the saw blade in such a manner that the saw blade will cease to operate on reaching that limit.

A still further object of my invention is a clamp for sustaining the work in its operative position to the saw, the jaw of which for supporting the material to be cut at differing angles relative to the direction of cut of the saw blade, is sustained at its end adjacent the saw blade against a fixed bearing on which said jaw has a shifting movement maintaining the adjacent end portion of the jaw throughout its adjustment in a fixed relative position to the saw blade.

With these ends in view, my invention finds embodiment in certain features of novelty in the construction, combination and arrangement of parts by which the said objects and certain other objects are hereinafter attained, all as fully described with reference to the accompanying drawings, and more particularly pointed out in the claims.

In said drawings:

Figure 1 illustrates a side elevation of a band saw machine in which my invention finds embodiment.

Fig. 2 is an end elevation thereof.

Fig. 2ª is a detail cross section through the saw carriage trackway and rack bar.

Fig. 3 is a detail section showing the construction of the support and adjusting device for the saw carriage.

Fig. 4 is a top plan view.

Fig. 5 is a transverse section on the line 5—5 of Fig. 4 looking in the direction of the arrows.

Fig. 6 (Sheet 1) is a detail transverse section on the line 6—6 of Fig. 7 looking in the direction of the arrows.

Fig. 7 is a detail section longitudinally of the shaft for tilting the saw carriage.

Fig. 8 (Sheet 3) is a transverse section through the coupling of the drive shaft on the line 8—8 of Fig. 4.

Fig. 9 is a detail longitudinal section of the drive shaft coupling,

Fig. 10 illustrates diagrammatically a modification of the arrangement of the pulley supports for the saw blade.

Fig. 11 illustrates a still further modification of the arrangement of the pulley supporting the saw blade.

Fig. 12 (Sheet 4) is an enlarged detail section of a modified form of saw guide taken on the line 12 of Fig. 14, looking in the direction of the arrow.

Fig. 13 is an enlarged detail longitudinal section through one of the two universal joints of the drive shaft of the machine.

Fig. 14 is a side elevation of the modified form of saw guides of Fig. 12.

Fig. 15 is a front elevation of the same.

Fig. 16 is a front end view of the modified saw guide showing the position of the band saw therein, and—

Fig. 17 is a section of the same taken on the line 17 of Fig. 12.

Similar characters of reference indicate the same parts in the several figures of the drawing.

The fixed frame of the machine may be of any suitable construction, as for example, opposing side frames, each of which consists of base bars 18, spaced upright bars 19 and 20 toward the front end of the machine, and top bar 21, the lower portion of the upright bar 20 curving toward the rear end of the machine at which latter point the base supports an obliquely projecting bar 22.

These base bars are preferably provided with slotted lugs 23—23 for retaining bolts, not shown, securing the machine to a floor, or other suitable foundation.

Supported on the upper ends of these side frames and secured to the uprights 19 and 20 by bolts 24—24 is a work-table 25 provided at its front edge with a depending flange 26, and toward its rear edge with a similar and parallel flange 27, in which flanges the bolts are secured.

Cast with, or otherwise secured to the underside of the table and projecting rearwardly thereof is a plate 28, from which projects an arm 29 provided with a slot 30 registering with a similarly curved slot 31 in the table 25.

Rigidly secured to the plate 28 is the fixed jaw 32, in which the strips to be sawed while supported by the table are held by the movable jaw 33 in the path of the saw blade, hereinafter described, the movable jaw being adjusted for this purpose by means of a screw bolt 34 on which is a pawl 35, engaging a rack bar 36 forming (see Fig. 1) the bottom of a groove 37 in the work-table, serving as a guide for the movable jaw 33, which is adjusted by means of a lever 38 on the end of the screw-threaded bolt 34.

Any other construction of movable jaw and the means for adjusting it may, however, be employed.

The front side of the fixed jaw 32 is provided with a vertical groove 39 struck on the arc of a circle, and forming a bearing for the correspondingly convexed end 40 of a gage plate 41, and whereby a strip may be so held that it may be severed at predetermined differing angles transversely thereof by the band saw of the machine.

Following the swinging of the gage plate upon its socket joint with the fixed jaw 32 of the clamp, and then locking the gage plate to the arm 29 or the table 25, as may be, by means of a bolt and nut 42, the bolt of which works in the segmental groove 30 or 31 as may be.

It will now be observed that the arc of the circle upon which the joint between the gage plate and the fixed jaw is formed is such that although the gage plate comes up close to, and its curved end portion 40 forms a portion of the slot 43, the adjacent end of the gage plate can never project in the path of the saw, or in other words the gage plate moves on the arc of a circle, the axis of which is at the adjacent end of the slot 43, and therefore at whatever angle the gage plate may be swung it can never be moved across the path of movement of the saw blade, especially during its backward movement past the gage plate as hereinafter described.

Journaled in bosses 44 (see Fig. 5) in the base bars 18 of the frame is a rock shaft 45, secured to which shaft are blocks 46 upon which are mounted at each side of the machine channel bars 47 forming the trackway and a rocking support for the band saw carriage.

The band saw carriage may be of any construction suitable for the purpose, but which as shown in the drawings consists (see Fig. 5) of a cross bar 48 from which extends toward the front of the machine side bars 49, which cross bar forms a support for an upright frame consisting of posts 50 and 51, one of which, 50, is at the extreme side of the carriage, and the other 51, inwardly removed from the opposite side, which bars curve forwardly at their upper ends, where they are connected by an angular cross bar 52, which projects some distance outwardly beyond the post 51, the posts 50 and 51 being further connected about mid-way their length by a cross bar 53.

The lugs 54 projecting from the rear ends of side bars have (see Figs. 2, 3 and 5) elongated slots 55, in which is vertically adjustable an axle 56 provided (see Fig. 4) at its opposite ends with rollers 57 supported by the bottom flange of the side bars 47.

Secured to the axle 56 by a set screw 56$^a$ is a mutilated pinion 58 meshing with a vertical rack bar 59 fixed in any suitable way to the side bar 49, and oscillated by means of a hand screw 60 working in a plate 61, secured by bolts 62 to the bar 48 of the carriage, and to which end the hand screw is socketed in a loose collar 63 on the axle 56, and whereby the rear ends of the rocking channel bars are adjusted as hereinafter described.

The forward ends of the channel bars are connected and braced by a rod 64 and for the purposes of tilting the track-way formed by these channel bars, to utilize the gravity of the saw carriage for forcing the saw through the material to be severed, the forward ends of these channel bars are provided with a curved rack 65 meshing with which is a pinion 66 secured by a set screw 67 to a shaft 68 on the end of which is a hand lever 69 for oscillating the mutilated pinion 66 to raise and lower the channel bars.

Hand lever 69 (see Fig. 7) is secured to the shaft by a pin 70, and having a larger bore than the diameter of the shaft may be rocked thereon for engaging it with a segmental rack 71, a spring 72 on the outer end of the shaft 68 and bearing against the upper end of the hand lever 69 serves to hold the hand lever against accidental disengagement from the rack.

With the channel bars supported on the rock shaft 45 (see Fig. 3) and in the position shown in Fig. 3 the front ends of the tracks 47 are at about the limit of their upward stroke, and therefore about level, but it will be seen that by pushing the hand lever to the left in Fig. 3 the forward end of the track will be tilted downwardly on the rock shaft, and the rear end of the tracks accordingly elevated, and the saw carriage correspondingly run down hill on its tracks, whereby both the gravity and momentum of the carriage are utilized for forcing the band saw through the strips to be severed.

In suitable bearings in the forward end of the side bars 49 of the carriage (see Figs. 1, 2, 3 and 5) is an axle 73 at the opposite ends of which are rollers 74, which like the rollers 57 travel upon a track way formed by the flange of the side bar 47, and thereby furnish a support for the forward end of the carriage.

Secured to the flange of the channel bars at each side of the machine by means of rivets or bolts 75 is a rack bar 76 with which mesh pinions 77 on the shaft 73, thereby directing the carriage in a straight line and preventing one side from moving faster or slower than the other, the lateral oscillation of the carriage being further prevented by a horizontal roller 78 on a lug 79 projecting from one of the side bars 49 of the carriage.

With the carriage supported by the rollers 57 and 74 as above described, and in the horizontal position shown in Figs. 2, 3 and 5, it will now be seen that on moving the hand lever 69 inwardly toward the machine, the front end of the track way will be tilted downwardly, and the rear end upwardly accordingly, with the result that the cutting edge of the saw blade 80 will be accordingly tilted forward, which is objectionable when a vertical cut is to be made.

The saw blade, however, may be moved toward a vertical position by forcing the axle 56 downwardly by means of the hand screw 60, the effect of which will be to rotate the mutilated pinions 58, and by their engagement with the rack bars 59 operate to lower the rear end of the saw carriage, and correspondingly tilt the saw blade, which blade may however thereafter be adjusted until the saw is again brought to a vertical line without disturbing the inclined position of its track-way.

The devices above described not only serve to utilize the gravity of the carriage for moving the saw toward its work, but to adjust the saw blade to make a cut at any desired angle in the work, and in this connection it is proper to observe that for these purposes the rock shaft 45 and 46 is preferably located at midway the length of the track-way, as shown in the drawings.

The cutting portion of band saw 80 is supported at its top by a pulley 81 on a pintle 82, secured to a lug 83, at the top of the overhanging frame, on which pintle the pulley 81 is loose and secured in its operative position by means of collars 84 and 85 at opposite sides thereof tightened upon the pintle by set screws 86—86, the collar 84 having secured thereto a handle 87 by means of which the operator controls the backward and forward movement of the band saw, and its supporting devices.

The lower end of the cutting edge of the band saw is supported on a pulley 88 on a pintle 89 in a lug 90 projecting from one of the side bars 49.

The pulley 88 is directly below the pulley 81 with the result that the front or cutting portion of the band saw travels on a line parallel to that of a line passing through the axes of the two pulleys, from which pulleys the upper portion of the band saw is directed to and over a pulley 91, and from the pulley 88 rearwardly to a pulley 92 on a pintle 93 in a hub 94 projecting from the side bar 49 of the carriage.

It will now be observed that the axes of the pulleys 91 and 92 converge toward the end of the carriage; and that in operation the band saw passes in an inclined upward direction from the pulley 91 over the pulley 81, thence downwardly underneath the pulley 88, and in an inclined upward direction over pulley 92 to a pulley 95 at the rear of the machine, the axis of which pulley 95 is at a right angle to that of the pulleys 81 and 88.

The arrangement of these several band saw supporting pulleys at the rear of the pulleys 81 and 88 and in the relation thereto and to each other as herein shown and described, is such that in diverting the cutting edge out of line with other portions of a band saw, the necessary torsion or twist in the blade is so distributed and slight that in its operation the blade is not retarded, and that no part of it is subjected to a torsional strain tending to fracture it, even when running at its highest rate of speed.

Projecting from the curved post 51 is a bracket 96 to which is bolted, or otherwise secured, a blade 97, the top edge of which forms a track-way for a sliding plate 98, on which is a lug 99 supporting a pintle 100, on which the pulley 95 and gear wheel 103 are sleeved, and held against lateral displacement by a collar 101 and set screw 102.

Working in the post 51 and bearing against the lug 99 is a hand screw 104 whereby the pulley 95 is adjustable for taking up slack in the band saw.

Meshing with the gear wheel 103 is a pinion 105 on a sectional drive shaft 106 driven by a belt pulley 107, and to which end said pulley is secured to the section 108 of the shaft, the fixed bearing of which is a hub 109, projecting from the side bar 22 of the frame.

The shaft section 108 is connected with the shaft section 110 by a universal joint 111, which (see Figs. 4 and 13) is of the usual and commonly employed construction.

The opposite end of the shaft section 110 projects into a sleeve 112 and bears against the walls thereof, and is supported by balls 113.

Secured in the opposite end of the sleeve 112 is a shaft section 114 by means of a screw 115, the ends of which shaft sections 110 and 114 are spaced apart as indicated at 116 (see Fig. 9) to form a take up for the shaft 110, lengthened and shortened as it is with reference to the fixed bearings of the shaft as hereinafter described.

The opposite end of the shaft 114 is connected with a shaft section 106 before described, and on which is the pinion 105, by means of a toggle 114ᵃ.

The shaft section 106 has its bearing in a hub 117 suspended by an arm 118 depending from the sliding plate 98 supporting the gear wheel 103.

It will now be observed that the balls 113, see Fig. 8 severally project into pockets in the shaft 110 and into grooves in opposition to each other in the sleeve 112, and serve not only as anti-friction devices for the shaft section 110 in its longitudinal movement, but at the same time operate to lock the shaft to the hub, whereby the revolutions of the shaft section 110 are imparted to the shaft section 114.

The reciprocations of the shaft section 110 in the sleeve 112 provide for the longitudinal expansion and contraction as a whole of the shaft 106, as for example, when the saw carriage is advanced from the position shown in Fig. 4 the shaft section 110 recedes from the section 114 and vice versa, as the carriage is moved toward the limit of its back stroke, and as the result of which a single shaft having a fixed bearing at both of its ends is successfully employed as the drive shaft for a band saw mounted upon a movable carriage and driven by a positive gear connection.

For obtaining the best results in band saw machines for the severing of metal bars and the like, and for which the construction of machines shown and described herein is intended and particularly adapted, the saw blade must be as rigidly sustained against both a backward and lateral movement at points below and above and as nearly adjacent to the metal to be severed, and with the least possible friction, and to these ends my invention includes a saw guide, the support for the back edge of the saw of which moves with a saw blade confined against lateral movement by rollers at opposite sides of the blade.

In Figs. 1, 2 and 5 is shown an upper saw guide by which these results are secured in which a lug 119 by means of a screw 120 is vertically adjustable on a bar 121, suspended from a lug 122 in which it is adjustable by means of a thumb screw 123, and may be locked by a screw 124. Projecting laterally from the lug 119 is a flange 125, supporting a plate 126 pivoted to the flange 125 by a pivot 127, the plate 126 being provided with an enlargement 128 forming a track way for a block 129 vertically adjustable by a set screw 130 passing through a lug 131 projecting from the block and impinging against the enlargement 128 of the plate 126.

Pivoted to and projecting from the head block 129 are rollers 132 and 133, and screwed to the block (see Fig. 12) for example, is a hub 134 on which are sleeved disks 135 and 136 between which in grooves toward their periphery are confined anti-friction balls 137, the sleeved disks being held in their operative position on the hub by means of a hub flange 138, and a washer 139 secured in its operative position by means of a set screw 140 and washer plate 141.

The disks 135 and 136 toward their peripheries span the space between the rollers 132 and 133 so that the disk adjacent to the rollers affords a movable bearing and back stop for the back edge of the saw at a point so near the periphery of the disk that being sleeved on the hub and together with its antifriction bearings reduces to a minimum friction between a saw blade and its back stop, while in the meantime the rollers 132 and 133 revolving freely on their axes as they do confines the saw blade against lateral movement.

In Figs. 14 to 17 inclusive are shown a modification of the upper saw guide and the means by which it is suspended by the bar 121, and to which end the hub for the disks 135 and 136 is provided with a screw-threaded end passing through the upright member 142 of an angle plate 143 mounted upon a pivot 157 secured to an arm 145, the opposite end of which is provided with an elongated slot 146 through which passes a screw 147 passing into and securing the arm against the end of the bar 121, the lateral guide rollers 148 and 149 between which the saw projects and against the disk 136 being likewise secured to the upright member 142 by means of screw bolts 150 secured in their operative positions by nuts 151 and passing through loose hubs 152—152 spacing the rollers 148 and 149 from the upright member 142.

Passing through a lug 153 of the plate 143 is a thumb screw 154, the screw-threaded end 155 of which works in the arm 145.

The inner side of the lug bears against a flange 156 on the screw so that as the screw is moved toward and from the arm 145, the plate 143 is swung upon its pivot 157, and the saw guides and supports thereby swung horizontally on the arc of a circle for the accurate and close adjustment of its rollers and disks to the saw blade, respectively passing between and bearing against them.

Below the work table is a saw guide 156ª mounted upon a pivot 156ᵇ supported by a post 156ᶜ, which as shown is of the usual construction commonly employed as the lower guide for band saws, but which in practice I prefer to be of the construction in Fig. 14 hereinbefore described.

It would however, not be a substantial departure from other important features of my invention to use other forms and constructions of saw guides although I regard that of the modification which is described, as not only cheap of construction, convenient of adjustment, but efficient in operation.

Moreover my invention is not limited to the hereinbefore specified arrangement of the pulleys by which the non-operating portions of a band saw are deflected laterally at an angle to the vertical path or line of travel of the operating portion thereof, and this whether a band saw is mounted upon a reciprocating carriage, a pivoted support, or a fixed support.

For example, in Fig. 10 is diagrammatically illustrated a horizontally U-shaped frame 158 at the free ends of which are pivoted pulleys 159 and 160, between which the operating portion 161 is conducted and thence deflected rearwardly over upper and lower pulleys 162 and 163 pivoted to arms 164—164 and thence rearwardly thereof over a quite large pulley 165 pivoted to an arm 166 projecting from and forming a part of the frame 158, which frame may be fixed to a base 167 as may be desired.

It will now be observed that in Fig. 10 the axes of the pulleys 162, 163, are at a right angle to the axes of the pulleys 159 and 160 between which the operating portion of the saw blade is extended and that the saw blade is conducted from these last named pulleys obliquely thereto and thence in a direct line to the pulley 165 instead of on angles converging from the forward pulleys to the rear pulley as in Fig. 1.

In the still further modification illustrated in Fig. 5 the operating portion of the saw blade 161 passes, as indicated by the arrow from and to pulleys 168 and 169 thence over a pulley 170 around a pulley 171 and forwardly underneath a pulley 172 to the pulley 168, but that in arrangement the three rearward pulleys in Fig. 11 differ from their axial position from the corresponding pulleys in that their several axes are parallel to each other, and at a right angle to the axes of the forward pulleys supporting the operating portion of a band saw, whereas in Figs. 1 and 10 the axes of all the rear pulleys are at either a right angle or an oblique angle to the axes of the front pulleys.

These several arrangements of supports being for a band saw by which there is no limit to the length of strip that may be severed from a strip without limit in length, or which is continuous, it will now be observed that the arrangement of the band saw supporting pulleys in every instance is such that only a quarter turn is taken and at but four points in the saw blade and at such intervals thereof that the blade is not subjected to a strain tending to fracture or break it, that it may be run at its highest speed with the least possible resistance from friction with its supports, and that I am able to accomplish this important result by the employment of not more than five band saw supporting pulleys in arrangements severally differing from each other.

My invention in this respect, however, is not limited to any of the arrangements of pulleys herein shown and described, but includes any means by which a band saw may be supported and operated in any manner by which it is possible and practical to direct the operating portion thereof either vertically or at an oblique angle, with reference to the plane of the material being operated upon, and at the same time so deflect or divert other portions of a band saw away from the operating portion thereof at such an angle with reference to the path traveled by the operating portion of the blade, that no other portion thereof shall be an obstruction restricting the length of piece to be severed from a strip of unlimited length.

At this point is should be observed that the length of the work table and its relative position to the saw is such that it is adapted for supporting in its operative position for being severed a strip of indefinite length, and also in this position for a cut therethrough of an angle not less than forty-five degrees; that the depth of a right angle cut is limited only by the fixed member of a clamping jaw, which may be adjusted to any point rearwardly of that at which it is shown to be located in the drawings, limited only by the length of stroke of the saw carriage and the longitudinal extensibility of the driving shaft for the saw actuating mechanism.

In other words it is possible with my invention by extending the length of movement of the parts above referred to, to correspondingly extend the length of movement of the cutting portion of the saw, and the width of the material that may be completely severed.

So far as I am aware I am not only the first to disclose any means by which it is possible and practical to divert from the operating portion of a band saw other portions in paths none of which are parallel to that of the operating portion, but also the first to support a band saw in its operative position by means of a reciprocating carriage bodily, and by means of its gravity move and feed the saw against the material to be severed, or in which a band saw fed by gravity to the work is operated by means of a single drive shaft.

Having described my invention, what I claim and desire to secure by Letters Patent is:

1. A device for the purpose described comprising in combination a table, a band saw, a driving pulley and supporting pulleys therefor adapted to direct the operating portion of the saw along a path of movement perpendicular to the supporting surface of the table, and other pulleys directing portions of the saw along paths, not parallel with the path of the operating portion of the saw.

2. A device for the purpose described comprising in combination a table, a band saw, a driving and a number of supporting pulleys therefor adapted to direct the operating portion of the saw along a path of movement perpendicular to the supporting surface of the table, and all other portions along paths no one of which intersects a line perpendicular to the path of movement of the operating portion of the saw.

3. A device for the purpose described comprising in combination a table, a band saw, driving and supporting pulleys therefor adapted to direct the operating portion of the saw along a path of movement perpendicular to the supporting surface of the table, no one of which other portions is parallel to or intersected by a line perpendicular to the operating portion of the saw.

4. A device for the purpose described comprising in combination a table, a band saw, a driving pulley and supporting pulleys so arranged that the cutting portion of the blade is moved in a path perpendicular to the plane occupied by said table, and that the remaining portion of the blade moves in both straight and curved paths, no one of which is parallel to or intersects the path of the operating portion of the saw.

5. A band saw machine comprising in combination a band saw, pulleys supporting and directing the cutting portion of said blade, the axes of which pulleys are on lines perpendicular to a horizontal plane, a driving pulley, the axis of which extends at a right angle to said pulleys, and further pulleys, the line of the axes of which are at an oblique angle to the several before mentioned pulleys.

6. A band saw machine comprising in combination a band saw, supporting pulleys for the cutting portion of the blade thereof, the axes of which pulleys are parallel and extend on lines perpendicular to a line passing therethrough, a driving pulley the axis of which is on a line at a right angle to said pulleys, and other supporting pulleys intermediate the driving pulley, and said supporting pulleys, the axes of which other pulleys are on lines extending at oblique angles to said first mentioned three pulleys.

7. A band saw machine comprising in combination a band saw, a driving pulley and supporting pulleys therefor directing the operating portion of the blade along a line perpendicular to a horizontal plane, and other pulleys directing the remaining portions of the blade away therefrom along arcs of circles, and also on lines extending obliquely to a horizontal plane.

8. A band saw machine comprising in combination a band saw, supporting pulleys between which the operating portion of the blade is conducted in a vertical line, a driving pulley, and other supporting pulleys intermediate said first-named supporting pulleys, the arrangement of which said several pulleys is such that the teeth of the operating portion of the blade oppose the material to be sawed on a line perpendicular thereto, and that the remaining portions of the blade have a differing path of travel therefrom and from each other along lines projecting rearwardly of the material to be sawed, whereby pieces of indefinite length of substantial width may be sawed from strips of unlimited length, and from continuous lengths.

9. A band saw machine comprising in combination a band saw, driving and supporting pulleys therefor, supporting and conducting the cutting portion thereof along a line perpendicular to a horizontal plane, and the remaining portions rearwardly therefrom in differing planes, and against possible contact with a strip of unlimited length to be severed thereby, a tilting carriage and a flexible drive shaft connecting said carriage and pulleys.

10. A band saw machine comprising in combination a band saw, a driving pulley therefor, opposing pulleys suspending said band saw, supporting pulleys intermediate thereof and the driving pulley, a belt driven pulley, a sectional drive shaft, for connecting the belt and driving pulleys, universal joints, and an intermediate extensible joint in said driving shaft whereby a band saw having a bodily reciprocating movement may be operated from a single drive shaft.

11. A band saw machine comprising in combination a band saw, driving and supporting pulleys therefor, a reciprocating carriage supporting said pulleys, and band saw, a sectional drive shaft actuating said driving pulley, provided with bearings respectively fixed in the frame of the machine and said carriage, an extensible sleeve, and universal joints in said shaft at points intermediate said fixed bearings, whereby the saw is continuously operated by a single drive shaft, and throughout the reciprocations of the saw carriage.

12. A band saw machine comprising in combination a band saw, means for operating the same, a reciprocating carriage supporting said band saw, and means for tilting said carriage.

13. A band saw machine comprising in combination a band saw, supporting pulleys and operating mechanism therefor, a reciprocating carriage upon which said saw, pulleys and mechanism are supported, means for tilting said carriage, whereby the saw is inclined and movable by the gravity of the carriage down an incline to, and is fed to its work, and means whereby the operating portion of the saw may be moved from an inclined to a vertical position and the angle of the saw cut accordingly varied.

14. A band saw machine comprising in combination a band saw, separated supporting pulleys therefor, means for adjusting said pulleys and therewith the cutting portion of the saw toward and from a vertical line passing through the axes of said pulleys rearwardly thereof, the axes of which are permanently on lines oblique with reference to a horizontal plane, and to each other, and a driving pulley, the axis of which is on a fixed horizontal line, whereby a band saw may be operated, supported by and conducted over said several pulleys with but a quarter twist at two points in the non-operating portions thereof, and said non-operating portions be conducted rearwardly of a line passing transversely through the operating portion of the saw blade, and to the direction of the cut produced by its teeth.

15. A band saw machine comprising in combination a fixed frame, a reciprocating saw carriage supported by said frame, a band saw, driving and supporting pulleys therefor, a driving gear and a pinion therefor journaled in said frame, a single drive shaft, one end of which is journaled in said frame and the other in said carriage provided with universal joints, and an intermediate extensible joint.

16. A band saw machine comprising in combination a fixed frame, a reciprocating saw carriage, a band saw mounted thereon, a track supporting said carriage mounted upon the fixed frame, and means for adjustably varying the cutting pressure of the saw.

17. A band saw machine comprising in combination a fixed frame, a reciprocating saw carriage, a band saw supported by said carriage, a track way secured to said frame for and supporting said carriage, and means for tilting said track for actuating the carriage by gravity in a forward direction.

18. A band saw machine comprising in combination a reciprocating saw carriage, a band saw mounted thereon, a fixed frame, a track pivoted to and fulcrumed on said frame, and means whereby the track is tilted, whereby the gravity of the carriage and saw are utilized for automatically feeding the saw to its work.

19. A band saw machine comprising in combination a reciprocating saw carriage, a band saw mounted and operated thereon, a fixed frame, a track support for the carriage fulcrumed thereon, means for tilting said track, and thereby feeding the saw to its work by the gravity of the carriage moving down an incline plane, and means connecting said track and carriage for adjusting the operating portion of the saw toward and from a vertical line therethrough.

20. A band saw machine comprising in combination a fixed frame, a track at each side thereof fulcrumed on said frame, a hand lever for moving said track on its fulcrum, a saw carriage supported by said track, means connecting the opposite end portion of said track with said saw carriage for raising and lowering the rear end thereof, a band saw and driving and supporting pulleys mounted upon said carriage.

21. A band saw machine comprising in combination, a fixed frame, a track fulcrumed on said frame, means for tilting said track downwardly at its forward end, a saw carriage provided toward its forward end with a shifting fulcrum on said track, a band saw, driving and supporting pulleys journaled in said carriage supporting said saw, and means connecting the rear end of said carriage with its supporting track, and whereby the carriage may be tilted on its shifting fulcrum and the saw accordingly moved toward and from a vertical line therethrough.

22. A band saw machine comprising in combination a track, a fulcrum therefor intermediate its ends on which to tilt said track, a rack bar on the forward end thereof, a pinion meshing with said rack bar, a hand lever for actuating said track on its fulcrum, a reciprocating saw carriage fulcrumed at its forward end on said track, means toward the rear end of said track for adjusting the saw carriage to a tilted position of the track, a band saw, driving and supporting pulleys therefor provided with journals secured to said carriage whereby on tilting the track and the saw to an inclined position the operating portion of the saw may thereupon be re-adjusted to a vertical line passing therethrough.

23. A band saw machine comprising in combination a reciprocating saw carriage, a band saw, driving and supporting pulleys therefor mounted on said carriage, a fixed jaw, a gage plate, and a pivot bearing between and connecting one end of said gage plate with said jaw, whereby the gage plate may be adjusted on lines radial to the point of the entrance cut of the saw, and the strip to be sawed may be supported at different angles relative to the direction of cut of the saw.

24. A band saw machine comprising in combination a work table, fixed and movable clamping jaws therefor, respectively secured to and mounted upon the work table, a gage plate, a knuckle joint between and connecting one end of said gage plate with the fixed clamping jaw whereby said gage plate and the work may be adjusted to differing angles with reference to the direction of a saw, and means for locking said gage plate in its adjusted position.

25. A band saw machine comprising in combination a band saw, a stationary work table, a clamping jaw fixed to said table, a movable jaw therefor mounted thereon, a gage plate, a socket like connection between one end of said gage plate and the fixed jaw whereby the gage plate may be swung upon lines tangent to a circle, the axis of which is that of the movable jaw.

26. A band saw machine comprising in combination a band saw, driving and supporting pulleys therefor, and a swinging guide for said saw, the bearing face of which guide is rotated by the contact of the saw therewith.

27. A band saw machine comprising in combination a band saw, a pivoted guide therefor, comprising rollers preventing a lateral movement of the saw, one of which rollers forms a bearing for the back edge of the saw blade, all of which rollers are rotated by the direct contact of the blade therewith.

28. A band saw machine comprising in combination a band saw, a saw guide comprising rollers, the arrangement of which prevents a lateral movement of the saw blade passing between them, a rotatable disk against which the back edge of the saw blade has a bearing, and is rotated by the movement of the saw and anti-friction rollers upon which said disk is mounted.

In witness whereof, I have hereunto set my hand and affixed my seal this 10th day of December, A. D. 1913.

MARTIN E. SHINN. [L. S.]

Witnesses:
MILDRED ELSNER,
JNO. G. ELLIOTT.